Patented July 1, 1952

2,601,862

UNITED STATES PATENT OFFICE 2,601,862

OIL ABSORBING METHOD

William J. Thomson, Ambler, Pa.

No Drawing. Application June 28, 1947,
Serial No. 757,951

1 Claim. (Cl. 134—7)

This invention relates to an improved method for removing oil or grease from pavements, floors, and the like surfaces, particularly those composed of cement, concrete, stone, and the like.

It is well known that it is a difficult problem to inexpensively remove oil or grease from concrete. It is an important problem because it involves possible injury unless the oil or grease is removed. A fuel oil spill on a concrete pavement or floor may cause slipping or be a fire hazard. Oil or grease on garage or machine shop floors is also dangerous and otherwise undesirable. Besides low cost, a composition for removing dropped oil or grease should possess the quality of being harmless to the hands or to automobile tires with which it may come in contact. It is also desirable for a composition of this type to have an appearance similar to concrete, so that there will be as little contrast in appearance as possible between the part of a floor or other surface cleaned by it, and the remainder of the surface.

The present invention has for an object to provide an improved method using a composition, possessing such characteristics, for removing grease or oil from concrete and the like surfaces.

This and other objects of the invention are attained by the composition of the present invention, which comprises a substantially dehydrated precipitated absorbent product from dolomite comprising primarily calcium carbonate.

The material of the composition of the present invention is, in other words, impure, dehydrated, precipitated calcium carbonate which contains a small amount of lime and magnesia, obtained from dolomite, from which the magnesium carbonate has been substantially removed.

The formulation of a preferred embodiment is substantially as follows:

| | Parts by weight |
|---|---|
| Precipitated calcium carbonate | 90 |
| Precipitated lime | 2 |
| Precipitated magnesia | 8 |

It is a grayish, granular material comprising soft, porous, free-flowing granules.

In producing magnesium bicarbonate, which is widely used in the manufacture of pipe and boiler coverings as well as producing magnesia alba and magnesia for use in the pharaceutical and other trades, dolomite rock is calcined in a kiln at a high temperature by mixing it with coke (and air), and the carbon dioxide is driven off. The resultant calcium oxide and magnesium oxide are slaked and suspended in water. Subsequently the suspension is recarbonated in saturating tanks under pressure, usually using carbon dioxide recovered from the calcining step, to form insoluble calcium carbonate and the soluble magnesium bicarbonate. The filtrate is boiled to drive off some carbon dioxide, and white basic magnesium carbonate is precipitated.

The calcium carbonate precipitate containing some impurities of lime, magnesia, sometimes a trace of bicarbonate of magnesia, and ash is dehydrated in an oven to produce the product of the present invention.

Previously, this impure calcium carbonate has been disposed of as a waste product, and the step of heating in an oven was not applied.

According to the present invention, the impure calcium carbonate is dehydrated, preferably in an oven at a temperature in the range of about 250 degrees F. to about 430 degrees F., and most preferably at about 270 degrees F. for about 15 minutes. In any case, the temperature must be high enough for long enough to dehydrate substantially, but not high enough to calcine. It is then preferably put in moisture-proof containers for storage and shipment prior to use.

The particle size of the composition may be varied somewhat, but will ordinarily fall within the range of from $\frac{1}{16}''$ mesh to about $\frac{3}{16}''$ mesh particles. While a certain amount of fines is not detrimental, too many very fine particles may tend to be dusty, whereas very large particles may not be sufficiently absorbent. Large particles can be easily reduced to smaller ones by being crushed or tumbled.

While the product contains a very small amount of lime, an additional amount may be added, particularly to "cut" grease. For most uses, however, the lime is preferably kept below two per cent by weight, and may in some cases be washed out of the composition entirely.

The composition of the present invention is not to be confused with cement, ground limestone, or other materials containing calcium carbonate, since this particular structure of dolmite from which magnesium carbonate has been substantially removed and which has been dried, has been found particularly absorbent for oils and greases. It is to be emphasized that the material is primarily dehydrated, precipitated calcium carbonate which is vastly different from naturally occurring calcium carbonate. Its texture is soft and porous. Its softness can perhaps best be expressed by saying that it can be crushed in the fingers. Yet it is not agglomerate or "pasty," but rather a dry, free-flowing mass of solid particles.

In application, the composition is generously sprinkled on the area of concrete containing oil or grease, allowed to remain for a short period of time as for a period from several minutes to several hours, depending upon the amount of saturation of the oil or grease, and then swept up or otherwise removed.

The composition has several outstanding advantages over prior art compositions for the purposes. It is economical since it is made from a waste product previously thrown away. It is highly absorptive due to its soft, porous nature. It is soft, and does not mar polished surfaces as it will pulverize rather than scratch. It is not harmful to the hands or to rubber tires or shoes. It is easy to apply and remove and does its work almost instantly. It has an appearance similar to concrete naturally, although pigment may be added to match any floor.

It will be understood that the embodiments discussed herein and the uses for the embodiments are illustrative and I am not limited thereto except as in the appended claim.

What is claimed is:

A method for absorbing oils or greases from concrete and the like surfaces, comprising sprinkling thereon a composition consisting of 90 parts by weight dehydrated precipitated calcium carbonate, 2 parts by weight lime, and 8 parts by weight magnesia, allowing it to remain for a short period of time, and then removing said composition.

WILLIAM J. THOMSON.

REFERENCES CITED

The following references are of record in the file of this patent:

UNITED STATES PATENTS

| Number | Name | Date |
|---|---|---|
| 1,111,445 | Dunton | Sept. 22, 1914 |
| 2,196,949 | Young | Apr. 9, 1940 |
| 2,209,444 | De Becze | July 30, 1940 |
| 2,301,457 | Sadtler et al. | Nov. 10, 1942 |
| 2,317,961 | Tschirner | Apr. 27, 1943 |

FOREIGN PATENTS

| Number | Country | Date |
|---|---|---|
| 362,402 | Great Britain | May 27, 1930 |

OTHER REFERENCES

Gregory, "Uses and Applications of Chemicals and Related Materials," Reinhold Publishing Corp. (N. Y. C.) (1939), page 357.

Mellor, "Modern Inorganic Chemistry," pages 630 and 631, Longmans, Green and Co., New York 1939.